US008554851B2

(12) United States Patent
Vash et al.

(10) Patent No.: US 8,554,851 B2
(45) Date of Patent: Oct. 8, 2013

(54) APPARATUS, SYSTEM, AND METHODS FOR FACILITATING ONE-WAY ORDERING OF MESSAGES

(75) Inventors: James R. Vash, Littleton, MA (US); Vida Vakilotojar, Mountain View, CA (US); Bongjin Jung, Westford, MA (US); Yen-Cheng Liu, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 335 days.

(21) Appl. No.: 12/889,802

(22) Filed: Sep. 24, 2010

(65) Prior Publication Data

US 2012/0079032 A1 Mar. 29, 2012

(51) Int. Cl.
*G06F 15/16* (2006.01)

(52) U.S. Cl.
USPC ........... 709/206; 709/203; 709/230; 709/223; 709/224; 709/225; 370/389; 370/392; 711/146; 711/141; 711/142

(58) Field of Classification Search
USPC .......... 709/203, 230, 223–225, 206; 370/389, 370/392; 711/146, 141, 122
See application file for complete search history.

(56) References Cited

U.S. PATENT DOCUMENTS

2006/0129690 A1 6/2006 Hill et al.
2007/0055827 A1* 3/2007 Tsien ............................ 711/141
2008/0304479 A1* 12/2008 Scott et al. .................... 370/389

FOREIGN PATENT DOCUMENTS

EP 1301009 A1 4/2003
WO 2012/040689 A2 3/2012

OTHER PUBLICATIONS

International Search Report and Written Opinion for PCT Application No. PCT/US2011/053208, mailed on Apr. 10, 2012, 10 pages.
Azimi, et al., "Integration Challenges and Tradeoffs for Tera-scale Architectures," Tera-scale Computing, Intel Technology Journal, vol. 11, Issue 3, Aug. 22, 2007, pp. 173-184.
Marty, et al., "Coherence Ordering for Ring-based Chip Multiprocessors," 39th Annual IEEE/ACM Symposium on Microarchitecture (MICRO-39), 2006, pp. 1-12.
Jaleel, et al., "Last Level Cache (LLC) Performance of Data Mining Workloads on a CMP—A Case Study of Parallel Bioinformatics Workloads," High-Performance Computer Architecture, The Twelfth International Symposium, ISSN: 1530-0897, Feb. 11-15, 2006, pp. 88-98.
International Preliminary Report on Patentability for PCT Patent Application No. PCT/US2011/053208, mailed on Apr. 4, 2013; 7 pages.

* cited by examiner

*Primary Examiner* — Wing F Chan
*Assistant Examiner* — Benjamin M Thieu
(74) *Attorney, Agent, or Firm* — Law Office of R. Alan Burnett, P.S.

(57) ABSTRACT

Methods, apparatus and systems for facilitating one-way ordering of otherwise independent message classes. A one-way message ordering mechanism facilitates one-way ordering of messages of different message classes sent between interconnects employing independent pathways for the message classes. In one aspect, messages of a second message class may not pass messages of a first message class. Moreover, when messages of the first and second classes are received in sequence, the ordering mechanism ensures that messages of the first class are forwarded to, and received at, a next hop prior to forwarding messages of the second class.

16 Claims, 10 Drawing Sheets

100
Ring0
Ring1
I/O
110
108
112
QPI 0/1
QPI 2
IIO
Sbo NW
Sbo NE
Sbo SW
Sbo SE
NW Ingress
NW Egress
NE Egress
NE Ingress
SW Ingress
SW Egress
SE Egress
SE Ingress
114
116
118
120
122
124
126
128
Shared Memory
Directory
130
144
Filter
140
142
HA 0
HA 1
102 (typ)
104 (typ)
134
132
136 (typ)
138 (typ)
Agent
LLC
L1 / L2
Eng 2
Eng 3
Eng 6
Eng 10
Eng 12
Eng 13
Cbo 0
Cbo 1
Cbo 2
Cbo 3
Cbo 4
Cbo 5
Cbo 6
Cbo 7
Cbo 8
Cbo 9
Cbo 10
Cbo 11
Cbo 12
Cbo 13
Cbo 14
Cbo 15
Cbo 16
Cbo 17
AD
IV
AK
BL
106

APPARATUS, SYSTEM, AND METHODS FOR FACILITATING ONE-WAY ORDERING OF MESSAGES

FIELD OF THE INVENTION

The field of invention relates generally to computer systems and, more specifically but not exclusively relates to facilitating transfer operation of messages, packets, and information for interconnect technology, particularly to facilitating ordering of messages.

BACKGROUND INFORMATION

An interconnection network, such as, a ring, a bus, a point to point, or a mesh fabric, typically has independent message classes for forward progress or performance reasons. For example, one may group a particular type of messages into a message class to facilitate control and maintain different types of independent flow of each message class. Also, message classes may have different priorities and maintain that blockage in one message class does not prevent traffic flowing in another message class. Also, message classes may be executed at a link layer and allow for independent transmission channels to protocol layer agents. Some examples of message classes could be for snoop, data response, non-data response, special control functions, non-coherent, etc.

Additionally, a message in a particular class may be unordered with respect to other messages in the same class, and also with respect to other messages in different classes. Again, this may be for forward progress or for performance reasons. However, in some cases, there is a functional requirement that messages in different message classes maintain some kind of relative order. For example, in a cache coherence protocol, one may need to guarantee that a message corresponding to a particular cache line address cannot pass a previous message for the same cache line address sent in another message class to the same agent.

Presently, solutions do not exist for facilitating ordering of independent message classes sent between interconnects or segments of an interconnect network.

BRIEF DESCRIPTION OF THE DRAWINGS

The foregoing aspects and many of the attendant advantages of this invention will become more readily appreciated as the same becomes better understood by reference to the following detailed description, when taken in conjunction with the accompanying drawings, wherein like reference numerals refer to like parts throughout the various views unless otherwise specified.

DETAILED DESCRIPTION

Embodiments of methods, apparatus and systems for facilitating one-way ordering of otherwise independent message classes are described herein. In the following description, numerous specific details are set forth to provide a thorough understanding of embodiments of the invention. One skilled in the relevant art will recognize, however, that the invention can be practiced without one or more of the specific details, or with other methods, components, materials, etc. In other instances, well-known structures, materials, or operations are not shown or described in detail to avoid obscuring aspects of the invention.

Reference throughout this specification to "one embodiment" or "an embodiment" means that a particular feature, structure, or characteristic described in connection with the embodiment is included in at least one embodiment of the present invention. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

In various embodiments, the claimed subject matter describes a method, apparatus, and system to facilitate one-way ordering of otherwise independent message classes. In one example, a snoop message is described in the context of maintaining ordering with respect to a Global Observation (GO) message across an unordered buffered switch ring interconnect. However, the claimed subject matter is not limited to use for snoop and GO messages and will also be extended to any such ordering requirement across several variations of interconnect topologies that have certain properties that will be discussed later.

Embodiments of the invention disclosed herein disclose a method, apparatus, and system to ensure a one-way ordering between two independent message classes. In one embodiment, one example is depicted for ensuring a leader message from a first message class is ordered with respect to follower messages from a second message class.

Figure 1:
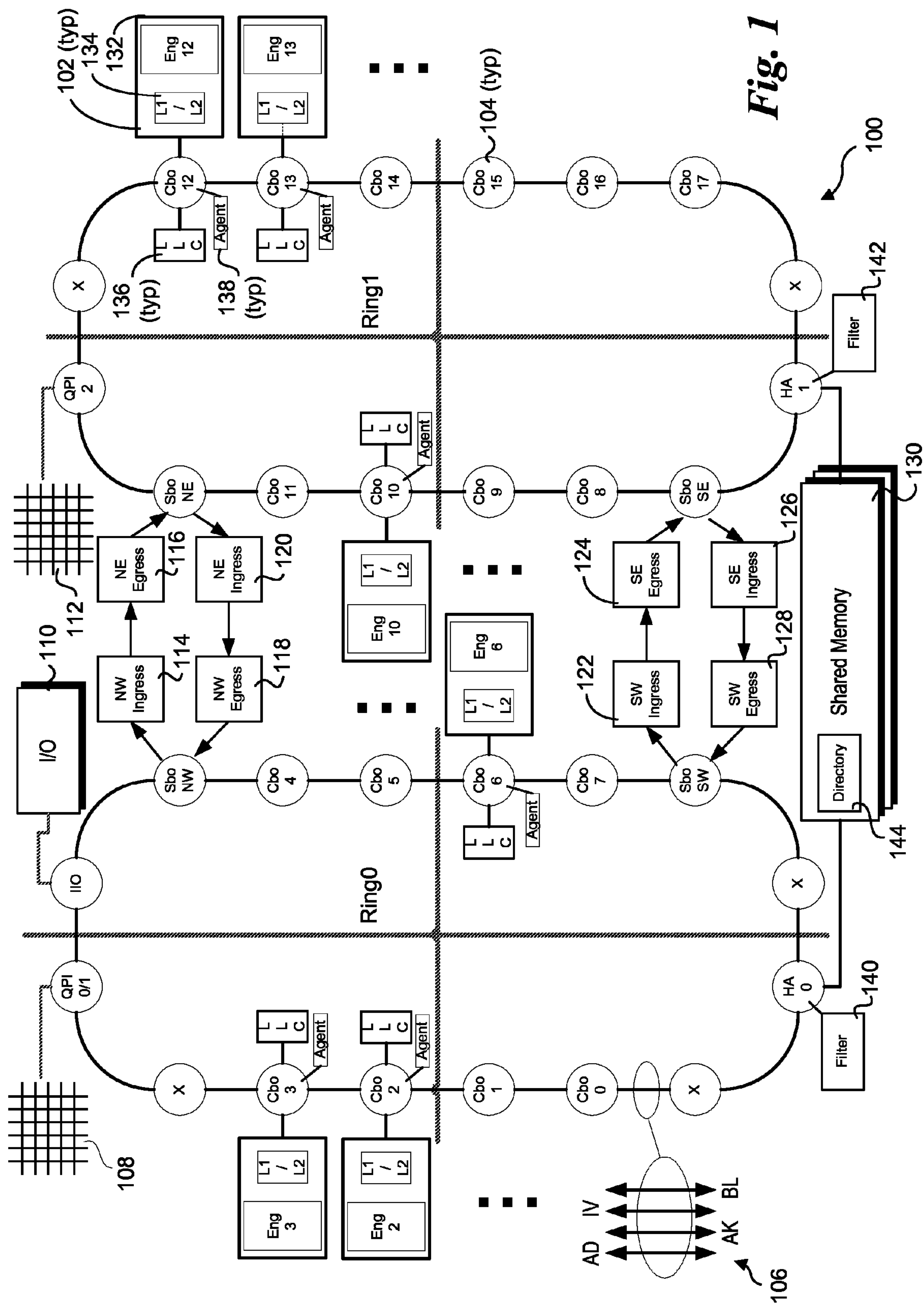
FIG. 1 is a schematic diagram illustrating an exemplary system architecture including two ring interconnects and multiple one-way message ordering mechanisms for facilitating ordering of messages of different message classes transferred between the two ring interconnects, according to one embodiment of the invention.

For clarity, individual components in the Figures herein may also be referred to by their labels in the Figures, rather than by a particular reference number. For example, the labeling of the nodes in FIG. 1 provide information identifying the node and/or its function; such information cannot be conveyed alone with a separate reference number. Additionally, reference numbers referring to a particular type of component (as opposed to a particular component) may be shown with a reference number followed by "(typ)" meaning "typical." It will be understood that the configuration of these components will be typical of similar components that may exist but are not shown in the drawing Figures for simplicity and clarity.

In one embodiment, one-way ordering of messages in independent message classes that are transferred across ring interconnects is provided. A system 100 in FIG. 1 shows an exemplary architecture under which a one-way ordering of independent message classes may be implemented. System 100 is illustrative of an advanced system architecture supporting multiple processor cores 102, each coupled to a respective node 104 on one of two ring interconnects, labeled and referred to herein as ring0 and ring1. For simplicity, the nodes for each of the ring0 and ring1 interconnects are shown being connected with a single line. As shown in detail 106, in one embodiment each of these ring interconnects include four separate sets of "wires" or electronic paths connecting each node, thus forming four rings for each of ring0 and ring1. In actual practice, there are multiple physical electronic paths corresponding to each wire that is illustrated. It will be understood by those skilled in the art that the use of a single line to show connections herein is for simplicity and clarity, as each particular connection may employ one or more electronic paths.

In the context of system 100, a cache coherency scheme is implemented by using independent message classes. Under a ring interconnect architecture, independent message classes may be implemented by employing respective wires for each message class. For example, in the aforementioned embodiment, each of ring0 and ring1 include four ringed paths or wires, labeled and referred to herein as AD, AK, IV, and BL. Accordingly, since the messages are sent over separate physical interconnect paths, they are independent of one another from a transmission point of view. In consideration of the possibility of different amounts of buffering delays being applied to the separate interconnect paths, it would thus be possible for messages of a given message class to "pass" messages of another message class when the message classes employ separate independent ring interconnect paths. However, there are instances where this may not be permitted.

In one embodiment, data is passed between nodes in a cyclical manner. For example, for each real or logical clock cycle, data is advanced from one node to an adjacent node in the ring. In one embodiment, various signals and data may travel in both a clockwise and counterclockwise direction around the ring. In one embodiment, at least some of the nodes in ring0 and ring1 are unbuffered.

Each of ring0 and ring1 include a plurality of nodes 104. Each node labeled Cbo n (where n is a number) is a node corresponding to a processor core sharing the same number n (as identified by the core's engine number n). There are also other type of nodes shown in system 100 including a QPI 0/1 node, which provides an interface to a QuickPath Interconnect (QPI) fabric 108, and an IIO node, which provides an interface to Input/Output interface 110. Similarly, Ring2 includes a QPI 2 node providing an interface with a QPI fabric 112. Further shown are a number of nodes marked with an "X"; these nodes are used for timing purposes. It is noted that the QPI, IIO, and X nodes are merely exemplary of one implementation architecture, whereas other architectures may have more or less of each type of node or none at all. Moreover, other types of nodes may also be implemented.

Another set of nodes included in system 100 are buffered switch ring stop nodes, which are labeled Sbo NW (Northwest), Sbo NE (Northeast), Sbo SW (Southwest) and Sbo SE (Southeast), wherein the NW, NE, SW, and SE designations correspond to the relative geographical location of the ring stop nodes relative to the diagram shown in FIG. 100. The ring stop nodes provide ingress and egress points for enabling signals and corresponding messages to cross between ring0 and ring1. For the North buffered switch ring stop nodes Sbo NW and Sbo NE, this is facilitated by a NW Ingress block 114, a NE Egress block 116, a NE Ingress bock 120, and a NW Egress block 118. For the South buffered switch ring stop nodes Sbo SW and Sbo SE this is facilitated by a SW Ingress block 122, a SE Egress block 124, a SE Ingress bock 126, and a SW Egress block 128. Each of the pathways between ring0 and ring1 employing an Ingress/Egress block pair implement a "half-tunnel" employing a one-way message ordering mechanism that is configured to facilitate transfer of message data between ring0 and ring1 in a manner that ensures a message of a first message class will be delivered before a related message of a second message class.

In the context of maintaining cache coherence in a multi-processor (or multi-core) environment, various mechanisms are employed to assure that data does not get corrupted. For example, in system 100, each of processor cores 102 is provided access to a shared memory store 130, which typically will comprise one or more banks of dynamic random access memory (DRAM). For simplicity, the memory interface circuitry for facilitating connection to the shared memory store is not shown; rather, the processor cores in each of ring0 and ring1 are shown respectively connected to the memory store via a home agent node 0 (HA 0) and a home agent node 1 (HA 1).

As each of the processor cores executes its respective code, various memory accesses will be performed. As is well known, modern processors employ one or more levels of memory cache to store cached memory lines closer to the core, thus enabling faster access to such memory. However, this entails copying memory from the shared (i.e., main) memory store to a local cache, meaning multiple copies of the same memory line may be present in the system. To maintain memory integrity, a cache coherency protocol is employed. Under the well-known MESI cache coherency protocol, when a processor (or core) makes a first copy of a memory line from main memory to its local cache, a mechanism is employed to mark the cache line as Exclusive (E), such that another core attempting to access the same memory line knows it does not have exclusive access to the memory line. If two or more cores have copies of the same cache line and the data in the line has not been changed (i.e., the data in the caches is the same as the line in main memory), the cache lines are in a shared (S) state. Once a change is made to the data in a local cache, the line is marked as modified (M) for that cache, and the other copies of the line are marked as Invalid (I), since they no longer reflect the changed state of data for the line. The state returns to Exclusive once the value in the modified cache line is written back to main memory.

Recently, Intel® Corporation introduced a new Forward or "F" state added to a modified MESI cache coherency protocol called the MESIF cache coherency protocol. The F state indicates that a cache should act as a designated responder for any requests for the given line. In a system of caches employing the MESI protocol, a cache line request that is received by multiple caches holding a line in the S state will receive multiple responses. In a system of caches employing the MESIF protocol, a cache line request will be responded to only by the cache holding the line in the F state.

It is noted that the MESI and MESIF protocols are examples of cache coherency protocols, and accordingly these are not to be limiting, but are used herein to explain the use of exemplary message classes.

It is also common to have multiple levels of caches, with caches closest to the processor core having the least latency and smallest size, and the caches further away being larger but having more latency. For example, a typical configuration might employ first and second level caches, commonly referred to as L1 and L2 caches. Another common configuration may further employ a third level or L3 cache.

In the context of system 100, the highest level cache is termed the Last Level Cache, or LLC. For example, the LLC for a given core may typically comprise an L3-type cache if L1 and L2 caches are also employed, or an L2-type cache if the only other cache is an L1 cache. Of course, this could be extended to further levels of cache, with the LLC corresponding to the last (i.e., highest) level of cache.

In the illustrated configuration of FIG. 1, each processor core includes a processing engine 132 coupled to an L1 or L1/L2 cache 134, which are "private" to that core. Meanwhile, each processor core is also co-located with a "slice" of a distributed LLC 136, wherein each of the other cores has access to all of the distributed slices. Under one embodiment, the distributed LLC is physically distributed among N cores using N blocks divided by corresponding address ranges. Under this distribution scheme, all N cores communicate with all N LLC slices, using an address hash to find the "home" slice for any given address. Suitable interconnect circuitry is employed for facilitating communication between the cores and the slices; however, such circuitry is not show in FIG. 1 for simplicity and clarity.

As further illustrated, each of nodes 104 in system 100 is associated with a cache agent 138, which are configured to perform messaging relating to signal and data initiation and reception in connection with a coherent cache protocol implemented by the system, wherein each cache agent 138 handles cache-related operations corresponding to addresses mapped to its collocated LLC 136. In addition, in one embodiment each of home agents HA0 and HA1 employ respective cache filters 140 and 142, and the various caching and home agents access and update cache line usage data stored in a directory 144 that is implemented in a portion of shared memory 130. It will be recognized by those skilled in the art that other techniques may be used for maintaining information pertaining to cache line usage.

As the number of cores increase in a system, the amount of message traffic needing to maintain cache coherence also increases. Different approaches may be used to reduce message traffic collisions and reduce latencies. One of these approaches is to use a ring interconnect, such as employed by system 100. Moreover, if separate wires are used for the different message classes, performance is further enhanced.

However, the separation of message classes on independent interconnect paths can lead to problems relating to message class ordering. For example, under one cache coherency protocol, a combination of Global Observation (GO) and Snoop (Snp) messages are employed (in part) for managing the cache line state data. When a GO message and a Snp message pertain to the same cache line, the GO message must precede the Snp message to provide unambiguous transfer of ownership to a core.

In the following description and as used further herein, operations are coarsely divided into two categories—those performed by a processing core and those that are performed by the rest of the system. Accordingly, operations associated with a processor core are referred to as a Core operation, while the rest of the system is termed Uncore. The following is described in the context of usage of GO and Snoop messaging and associated operations to support cache coherency. However, similar principles may be employed to support one-way ordering of other types of message classes.

When the Uncore returns a GO response to a Core, the expectation is that a subsequent Snoop to the address of the request receiving the GO would see the results of that GO. For example, if the Uncore sends GO for an RFO (read for ownership) request followed by a snoop to the same address in the next Uncore clock, then in certain cases one would expect the core to transition the line to M state and reply with a RspIFwdM (core cache is modified and will forward data and invalidate its copy) response back to the Uncore. In order to implement this principle, the protocol links the Request and Response Channels in a single tunnel such that the Core will receive the 2 messages in separate Core clocks in the proper order, allowing the Core to satisfy the guarantee. However, the Uncore must send the snoop message at least 1 clock cycle after the GO message, in order to make the order completely unambiguous.

In accordance with aspects of the invention, a mechanism is provided to enforce a one-way ordering between two message classes (in this example, GO<=Snp i.e., Snp cannot pass GO) across an unordered interconnect composed of various hops (in this example, each hop is a full ring or half ring) with buffering between each hop. Both the interconnect and the buffering are separate for each message class.

For each hop (whether starting from the original sender, or from inter-hop buffering), it is presumed that there is a way for the sender to confirm receipt of the "leader" message (GO) at the receiver. In the example, where each hop is a full ring or half ring with bounce flow control, this is done via a "mini-ring" at the sender which remembers when the message was sent, and knows how many cycles it would take for a bounced message to reappear at the sender's ring stop. The sender will know the message has been received if it does not pass by the sender on the ring at the time indicated by the mini-ring shadowing its path. This pre-requisite could also be achieved by fully crediting the message, explicit acknowledgement by the receiver, or some other means.

The mechanism therefore needs to ensure that within the buffering between each hop, a "follower" (Snp) message that is received cannot be sent before any relevant "leader" (GO) message previously received. An ideal measure of "relevancy" in this example would be to use the cache line address and receiver (sender is always the same for a given cache line address), but the cache line address is not present in the GO message. The next-best measure in the example would be a sender-receiver pair, but the Snp message can have multiple receivers, which would complicate this approach. The example here thus first presumes that all GO messages passing through a given buffer are relevant to all Snp messages passing through the same buffer, and then shows how one can extend the mechanism to order Snp/GO only when they are from the same sender.

FIGS. 2*a-e* illustrate the use of a mini-ring scheme for ensuring message ordering is maintained for a ring interconnect architecture employing independent message classes, according to one embodiment. Each of the diagrams in FIGS. 2*a-e* represent a state in time (i.e., timeframe) showing the progress of GO and Snp messages that are generated by the agent (agent 6) for Core 2. In this example, processing engine (Eng) 2 of core 2 desires to perform a write request to a memory location having an address corresponding to a cache line having a exclusive copy stored in the LLC associated with node Cbo 6 (collocated with core 6) and serviced by the agent 6. A GO message must be received to indicate transfer of ownership of a cache line. To make the ownership transfer unambiguous, the GO message must be received prior to any Snp messages corresponding to subsequent transactions for the same address. Meanwhile, the actual data corresponding to the cache line may be transmitted asynchronously to the requestor using data transfer facilities that are separate from the rings used for the GO and Snp messages. For example, as discussed above, each of the cores in the system may be connected to each LLC via a separate (from the ring architecture) interconnect. Alternatively, one or more ring paths in a ring interconnect architecture may be used for transfer of data.

The illustrated timeframe begins at the point in time when agent 6 has initiated delivery of a copy of the cache line data stored in the LLC of agent 6 to Core 2. At this point, a GO message is placed on the ring (i.e., ring0) at node Cbo 6. In order to place a message on the ring, there must be an empty slot corresponding to the message class. In the illustrated embodiment, the applicable ring is AK; accordingly, there must be an empty slot on the AK ring at node Cbo 6 to place the GO message on ring AK of ring0.

Figure 2B:
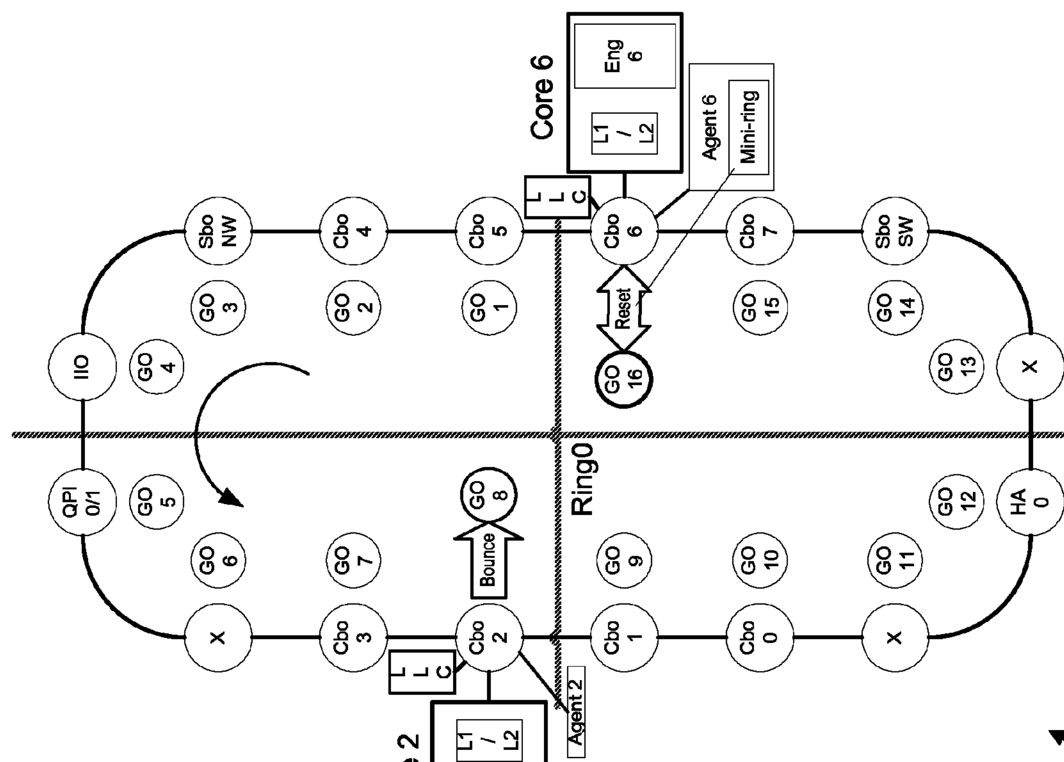
FIGS. 2*a-e* illustrate the use of a mini-ring scheme for ensuring message ordering is maintained in a ring of a ring interconnect architecture employing independent message classes, according to one embodiment.
Figure 2A:
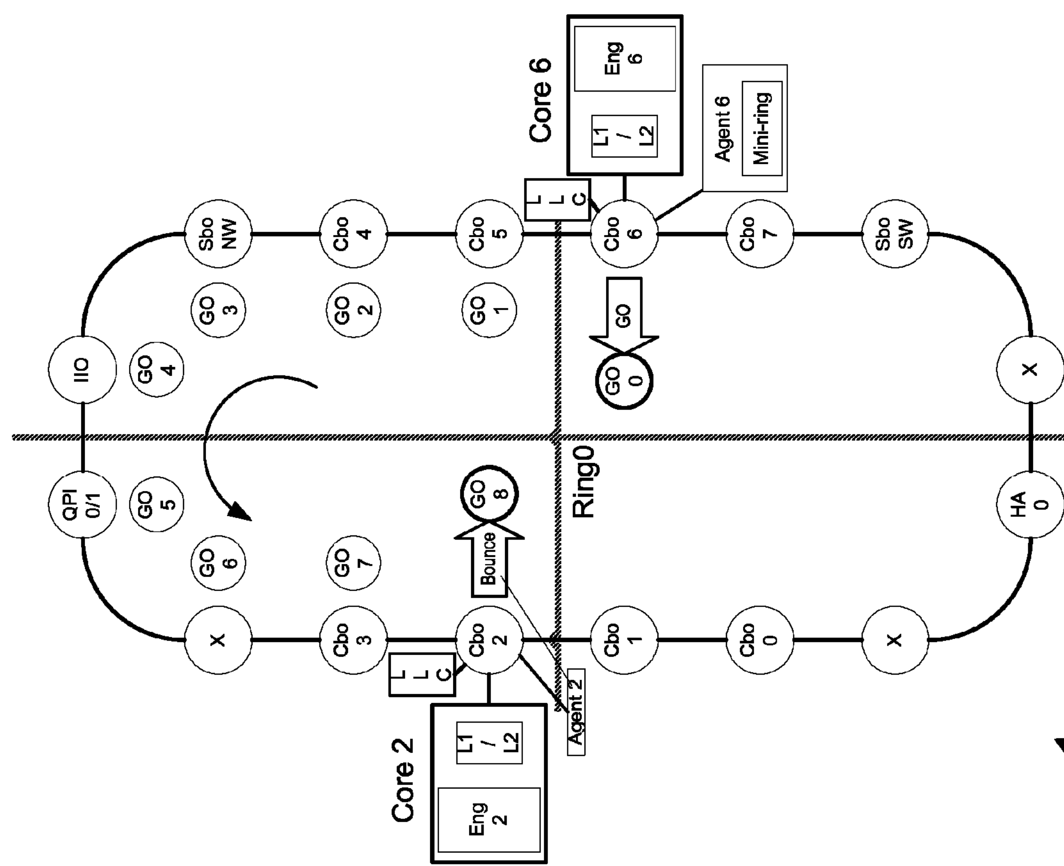

For point of illustration, Agent 6 is depicted in FIG. 2*a* as placing a GO message in ring AK of ring0 at node Cbo 6 at a time cycle "0". During each successive time cycle, message data on ring AK advance between adjacent nodes in the ring in a counterclockwise manner. Accordingly, the advancement of the GO message is depicted by circles labeled "GO n, where n represents the time cycle. In one embodiment, a time cycle corresponds to a clock cycle employed for the ring interconnect. In general, the clock cycle may be the same as the clock cycle used for a core, may be a multiple of the core clock cycle, or may be separately clocked.

As the GO message traverses the ring it reaches its destination node, which is node Cbo 2 collocated with Core 2. It is possible for a message to be "bounced" at its intended destination node, due to timing mismatch and/or buffer availability. An example of a message that has been bounced is depicted at a time cycle 8 corresponding to timeframe 200 in FIG. 2*a*. As a result, the message will not be received by Core 2, and will be forwarded around the ring until it can be received at its intended destination. An example of this is depicted in FIGS. 2*b-d*.

The mini-ring employed by agent 6 shadows the progression of the messages it places on the ring such that it can determine if a message has been received by failing to detect the presence of the message at its corresponding node (i.e., node Cbo 6) at an appropriate time cycle offset. For example, for ring0 there are 16 nodes, so the time cycle offset is 16 time cycles. Accordingly, at time cycle 16 agent 6 will check AK ring data at Cbo 6 and see whether it corresponds to a GO message it placed on the ring at time cycle 0. If it does not, then the agent knows the GO message was received at its destination, and was not bounced. If the AK ring message is the same GO message, then the message was bounced; as a result, the cycle counter in the min-ring is reset for the GO message, as depicted at timeframe 202 in FIG. 2*b*.

Figure 2D:
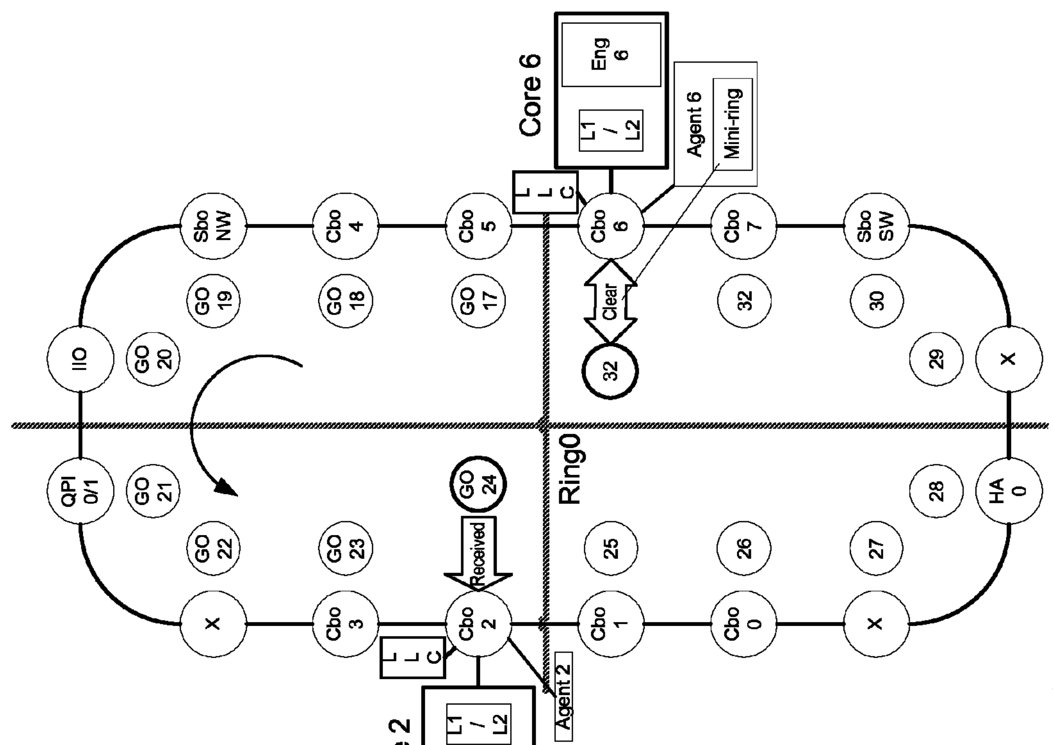
Figure 2C:
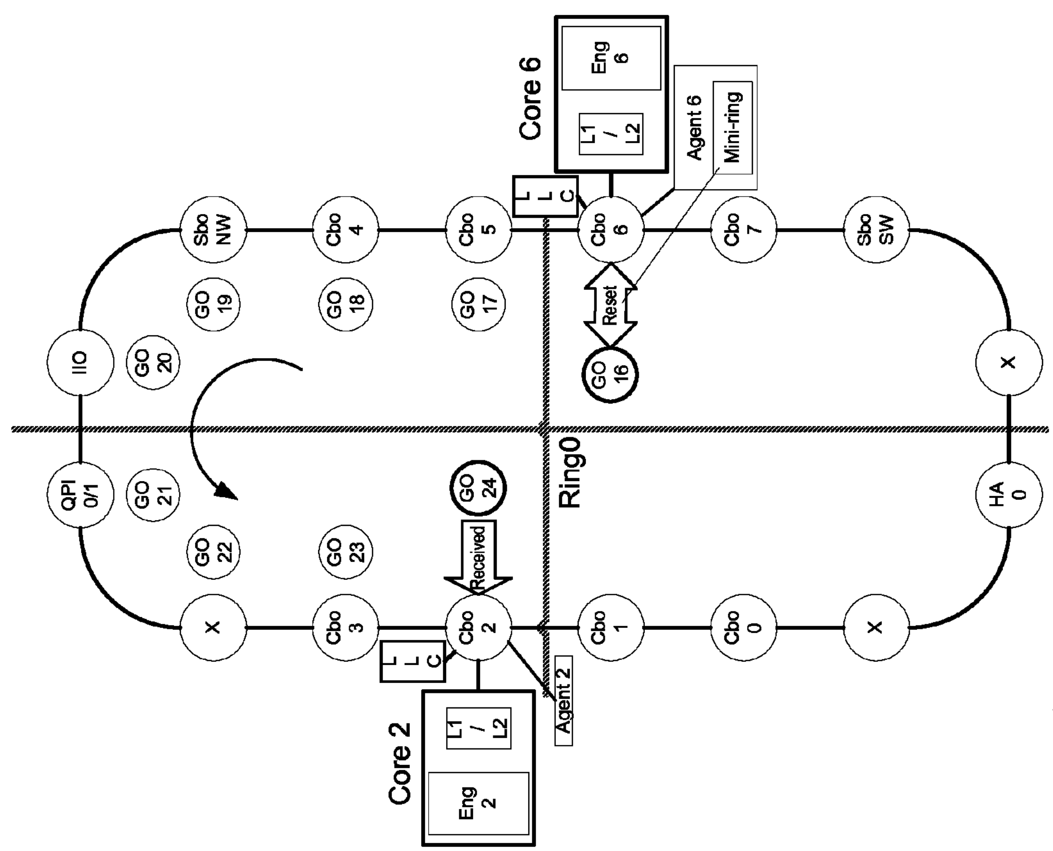

The process is continued, with the GO message traversing the ring0 nodes a second time until a time cycle 24 corresponding to a timeframe 204 is reached, as shown in FIG. 2*c*. At this point, there is sufficient buffer space available at the interface to core 2 to receive the GO message. When a destination core is able to receive a message, the message is termed to be "sunk." Accordingly, the GO message is sunk at timeframe 204 corresponding time cycle 24.

Figure 2E:
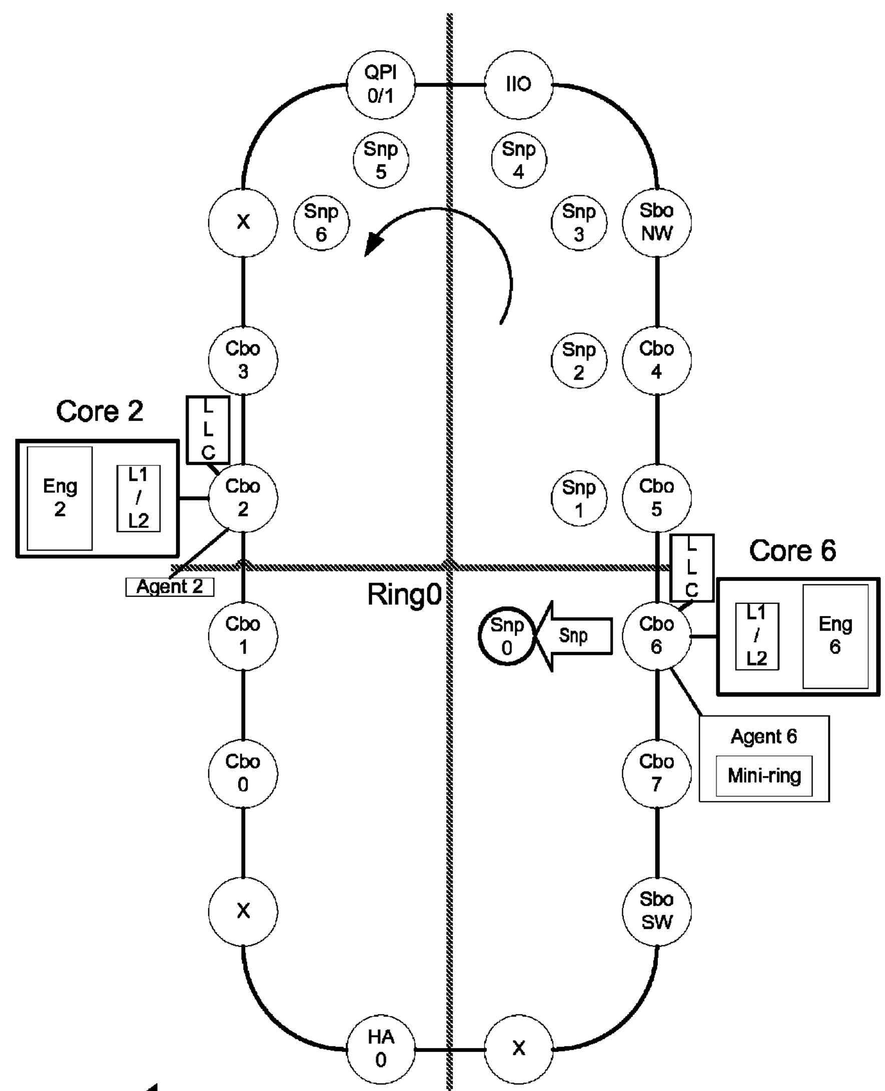

As shown in FIG. 2*d*, the slot corresponding to the GO message data at timeframes 200 and 202 continues to traverse ring° until it returns to node Cbo 6 at a time cycle 32 corresponding to a timeframe 206. At this point, agent 6 checks the corresponding AK ring message data and determines that it does not match the message data sent 16 time cycles prior. As a result, agent 6 determines that the GO message has been sunk, and it does not need to track the GO in its mini-ring anymore. Moreover, since the GO message has been sunk, a Snp message corresponding to the address can now be sent on ring IV of ring0. This is depicted in FIG. 2*e*, wherein at a timeframe 208 corresponds to 6 time cycles after the Snp message is placed on the IV ring of Ring0. As with the GO message class, Snp messages can only be placed on the ring when a corresponding empty slot is available during a given time cycle. Also, as before, a Snp message can only be sunk (i.e., received at a destination node) if adequate buffer space is available. Thus, the Snp message may traverse at least part of the ring one or more times until it is sunk.

The preceding mini-ring scheme guarantees one-way ordering of messages in independent message classes mapped to different rings of Ring0 relating to the same address. For example, since a Snp message relating to a transaction cannot be placed on the ring until after a corresponding GO message has been sunk, there is no way that the Snp message will ever be sunk before the GO message.

However, the mini-ring scheme doesn't facilitate one-way ordering of messages in independent message classes when the messages must cross between ring interconnects, such as between ring0 and ring1 in system 100. As described in detail below, this is facilitated via a one-way message ordering mechanism employed in the buffered switches that cross between the two rings.

Figure 3:
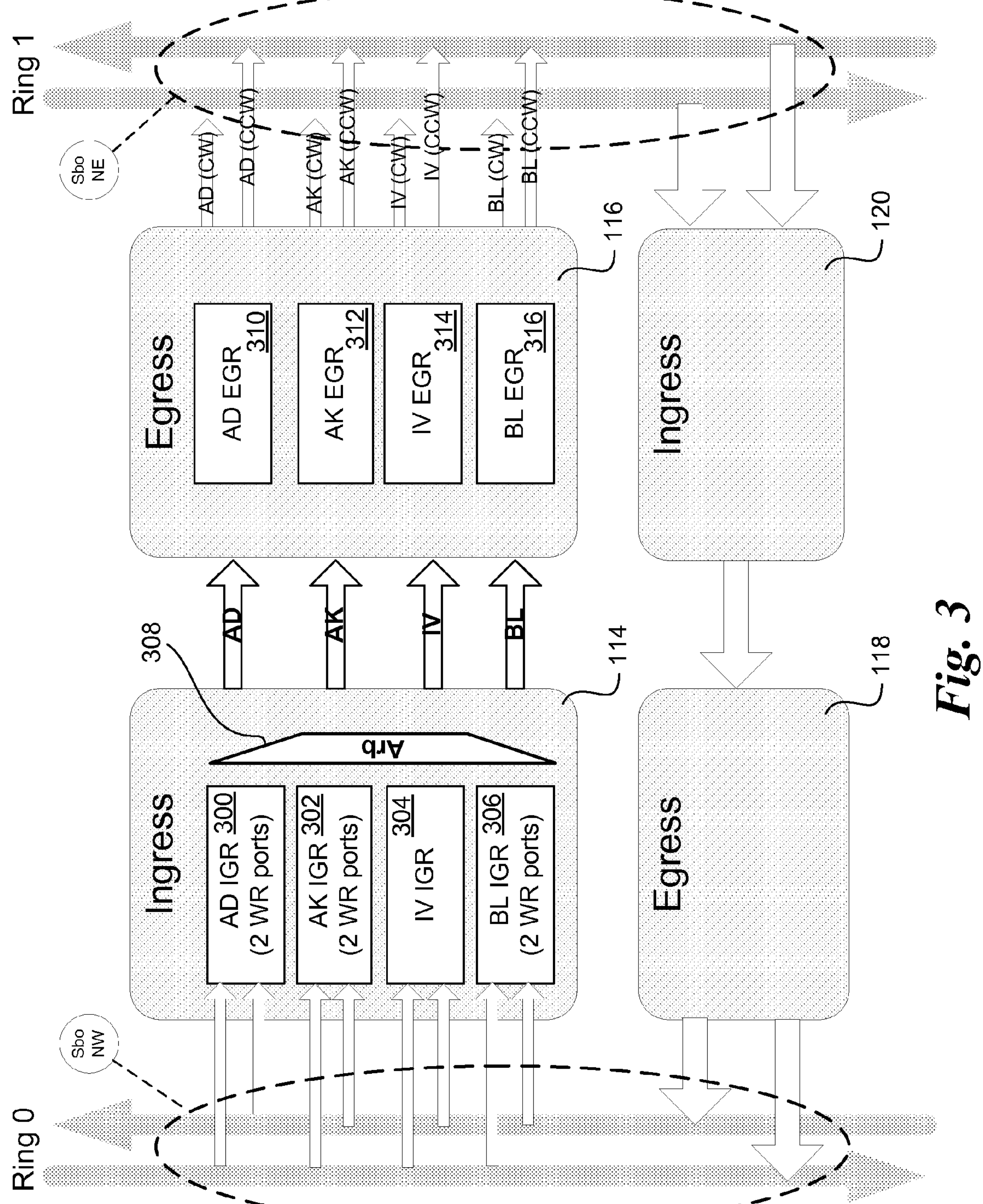
FIG. 3 is a block diagram illustrating high-level details of a one-way message ordering mechanism, according to one embodiment of the invention.

FIG. 3 is a high level block diagram showing further details of the buffered switches corresponding to the one-way ordering mechanism of system 100. In FIG. 3, details of the blocks for the North buffered switches are shown—however, it will be understood that the South buffered switches (e.g., the pathways between the Sbo SW and Sbo SE nodes) are configured in a similar manner.

In one embodiment, NW Ingress block 114 includes an ingress block for each of the message class rings; in this example these include an AD ingress block 300, an AK ingress block 302, an IV ingress block 304, and a BL ingress block 306. In one embodiment, each of the ingress blocks includes a pair of Write (WR) ports, except for IV ingress block 306. An arbiter 308 is employed for managing transfer of signals for the ingress blocks to NE Egress block 116. In one embodiment, NE Egress block includes an AD Egress block 310, an AK Egress block 312, an IV Egress block 314, and a BL Egress block 316.

FIG. 3 also shows NE Ingress block 120 and NW Egress block 118. It will be understood that each of these blocks have a similar configuration to their respective Ingress and Egress blocks shown in the upper portion of FIG. 3 and described above. As further shown, each of the ring interconnect paths of ring0 and ring1 include a pair of signal paths for each independent message class ring, one for sending messages clockwise (CW) around a ring, and the other for sending messages counterclockwise (CCW). Accordingly, there is a pair of input signals corresponding to each message class that is received by an ingress block, buffered and forwarded to an egress block. As discussed above, each signal path is physically implemented using multiple electrical pathways, with reference to a "signal path" or "wire" used for simplicity.

Figure 4:
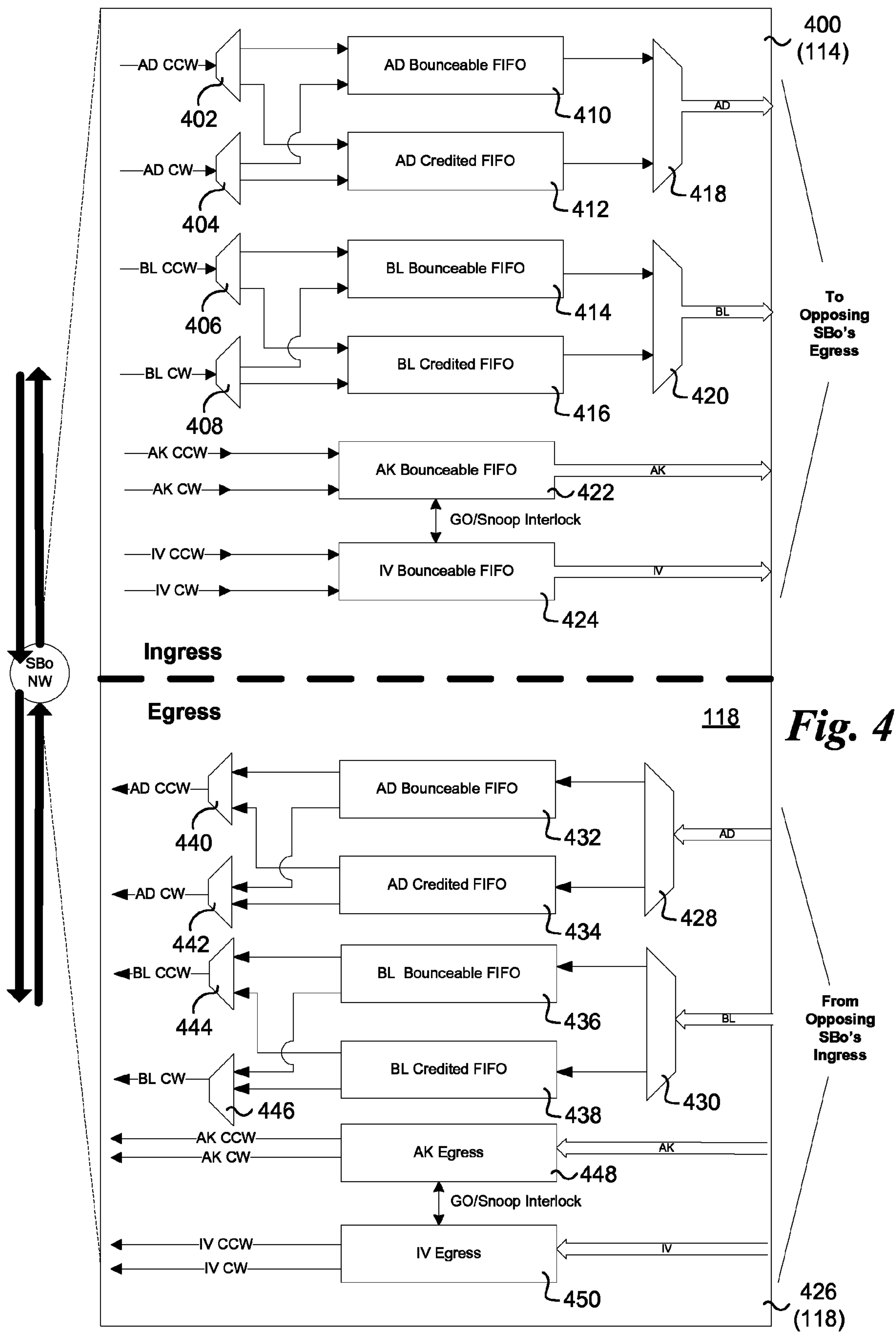
FIG. 4 is a schematic diagram illustrating further details of an Ingress and Egress block coupled to a ring stop node of a ring interconnect, according to one embodiment of the invention.

FIG. 4 shows a further drill-down of details of an Ingress and Egress block, according to one embodiment. An Ingress block 400 includes de-multiplexers 402, 404, 406, and 408 for de-multiplexing the AD and BL signals into an AD bounceable FIFO 410, an AD credited FIFO 412, a BL bounceable FIFO 414 and a BL credited FIFO 416. Respective arbiters 418 and 420 are used to arbitrate the AD and BL outputs to be received by an opposing SBo's Egress block. Meanwhile, the CCW and CW AK and IV signals are buffered in a respective AK bounceable FIFO 422 and an IV bounceable FIFO 424. The outputs of the AK and IV FIFOs are provided as inputs to the opposing SBo's Egress block.

An Egress block 426 receives the signals output by a corresponding Ingress block. De-multiplexers 428 and 430 respectively de-multiplex the AD and BL signals into an AD bounceable FIFO 432, an AD credited FIFO 434, a BL bounceable FIFO 436 and a BL credited FIFO 438. The outputs of these FIFOs are arbitrated by arbiters 440, 442, 444, and 446. Additionally, the AK and IV signals from the Ingress block output are respectively received by an AK Egress block 448 and an IV Egress block 450.

FIG. 4 also shows a GO/Snoop Interlock between AK Bounceable FIFO 422 and IV Bounceable FIFO 424, and a GO/Snoop Interlock between AK Egress block 448 and IV Egress block 450. Details of one embodiment of a GO/Snoop Interlock are discussed below with reference to FIG. 5. As shown by the dashed box in FIG. 4 and illustrated in FIG. 5, the Go/Snoop Interlock includes components that are part of both an ingress and egress block pair. In brief, the interlock provides a one-way message ordering mechanism that ensures that messages of a first class (e.g., GO messages on AK) received at a given ingress block cannot be passed by messages of a second class (e.g., Snoop messages on IV) received at the same ingress block. Meanwhile, messages of the first class are permitted to pass messages of the second class under applicable circumstances.

Figure 5:
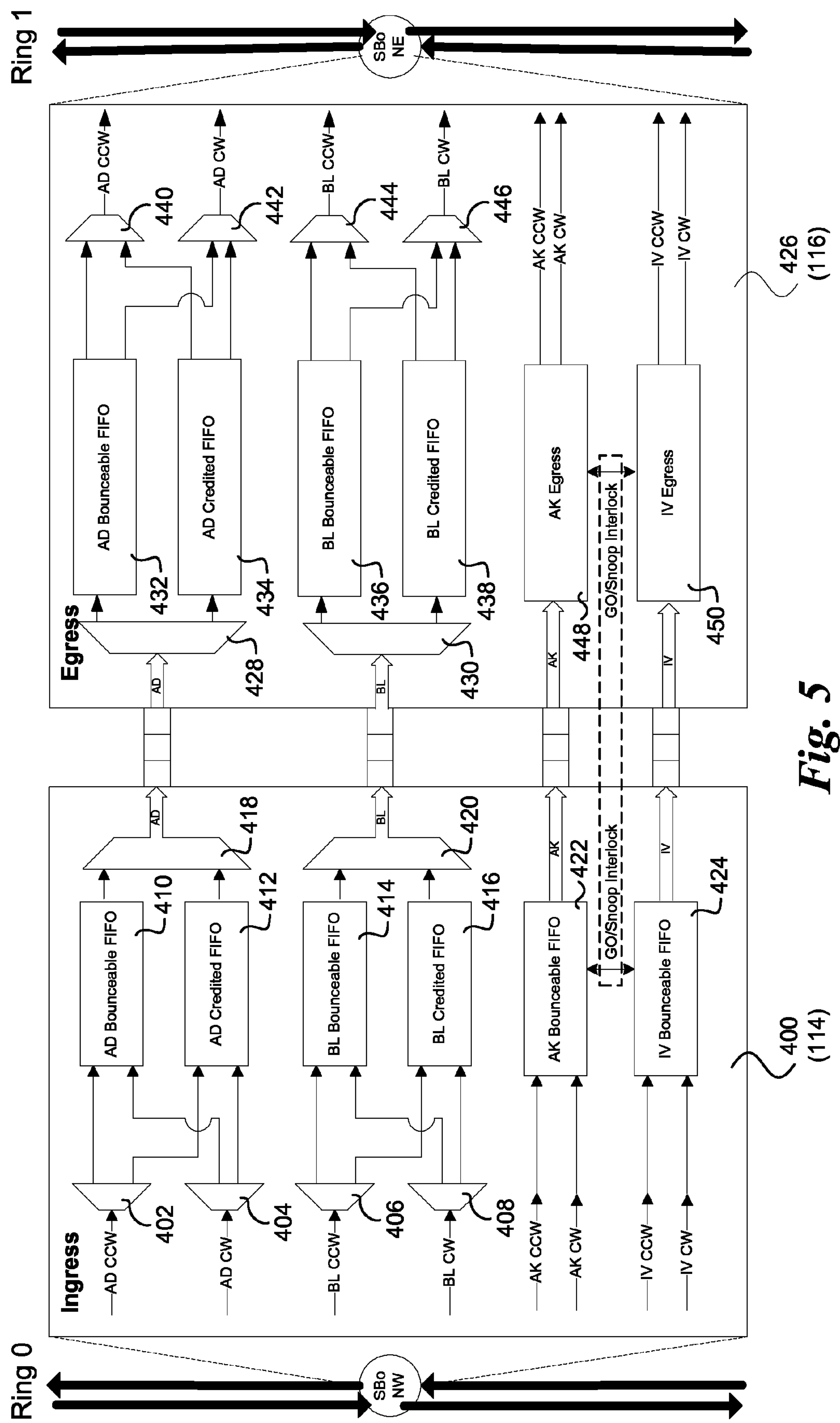
FIG. 5 is a schematic diagram illustrating details of an Ingress and Egress block pair coupled between ring stop nodes of respective ring interconnects, according to one embodiment of the invention.

FIG. 5 shows another illustration of the Ingress and Egress block configurations. In this diagram, data are showed being received from an Ingress Sbo node (Sbo NW) at an Ingress block, being passed between the Ingress block to an Egress block, and forwarded to an Egress Sbo node (Sbo NE).

Figure 6:
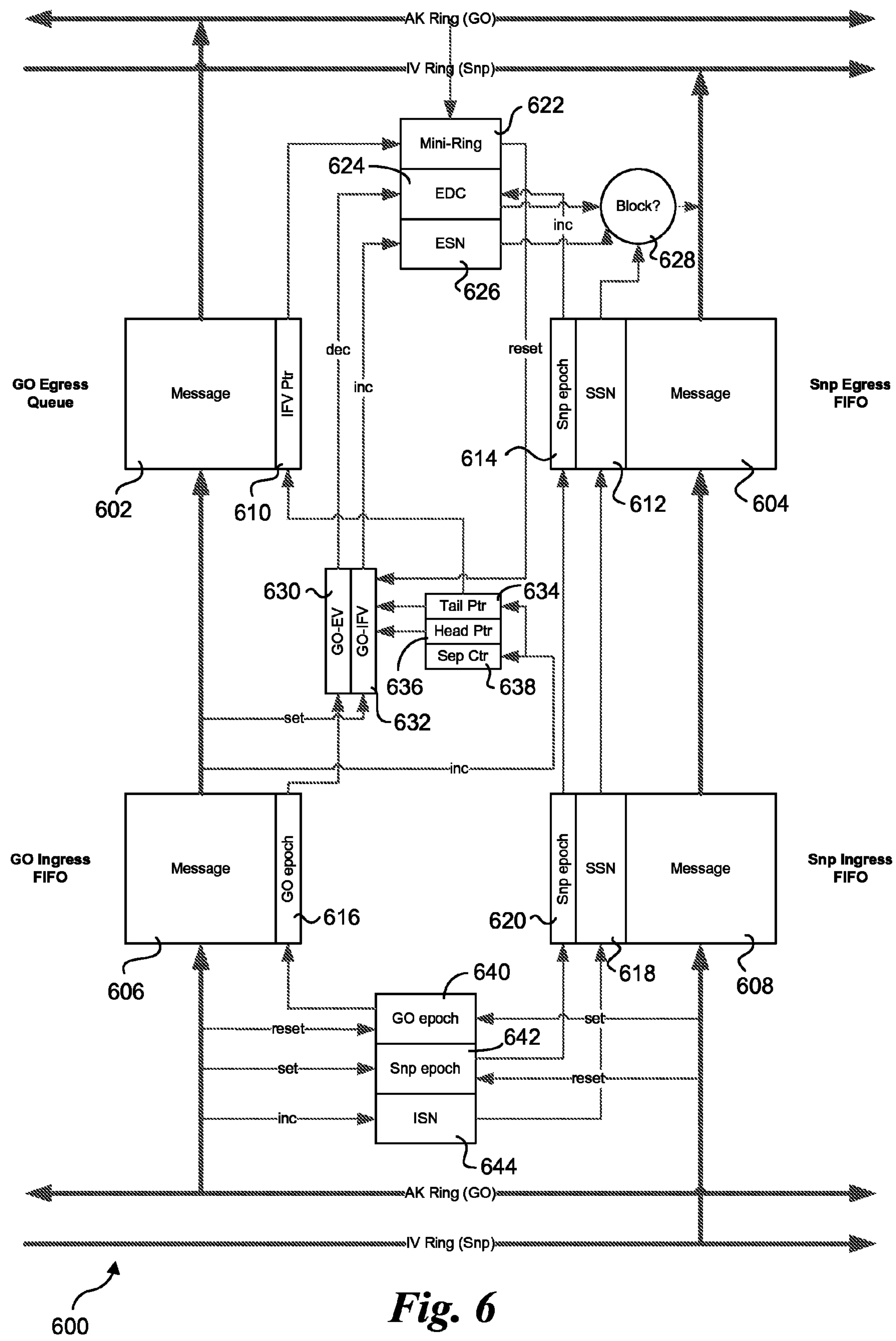
FIG. 6 is schematic diagram illustrating circuit components for facilitating a one-way message ordering mechanism, according to one embodiment of the invention.

FIG. 6 shows further details of one embodiment of a one-way message order mechanism 600. The mechanism employs a GO Egress Queue 602, a Snp Egress FIFO 604, a GO Ingress FIFO 606 and a Snp Ingress FIFO 608. Go Engress Queue 602 includes an IFV Ptr (In-flight Vector pointer) 610, while Snp Egress FIFO includes an SSN (Snp Serial Number) data block 612, and a Snp Epoch block 614. Go Ingress FIFO 606 includes a GO epoch data block 616, and Snp Ingress FIFO includes an SSN data block 618 and an Snp epoch data block 620. Toward the top of mechanism 600 is a mini-ring 622, an "epoch delta counter" (EDC) register 624, an "Egress Serial Number (ESN) register 626 and a decision block 628. Depicted in the center portion of the diagram is a "GO epoch vector" (GO-EV) register 630, a "GO In-flight Vector" (GO-IFV) register 632, a Tail Ptr 634, a Head Ptr 636, and a Sep Ctr (separation counter) 638. Toward the bottom of the diagram is a GO epoch register 640, a Snp epoch register 642, and an Ingress Serial Number (ISN) register 644.

The Ingress and Egress FIFOs are typical of buffers used by the buffered switches connecting rings 0 and 1 mentioned above. However, as further detailed in FIG. 2, each buffered switch employs buffering and related circuitry for multiple message classes employing independent paths. It will be understood that similar circuitry may be implemented for each of the buffered switches in system 100.

The functionality of the GO/Snoop interlock is provided by the circuit components shown in FIG. 6 that are coupled between the ingress and egress buffers (i.e., GO Egress Queue 602, Snp Egress FIFO 604, GO Ingress FIFO 606 and Snp Ingress FIFO 608). As discussed above, the GO/Snoop interlock comprises a one-way message ordering mechanism that ensures that messages of a first class (e.g., GO messages) received at a given ingress block cannot be passed by messages of a second class (e.g., Snoop messages) received at the same ingress block.

Figure 7A:
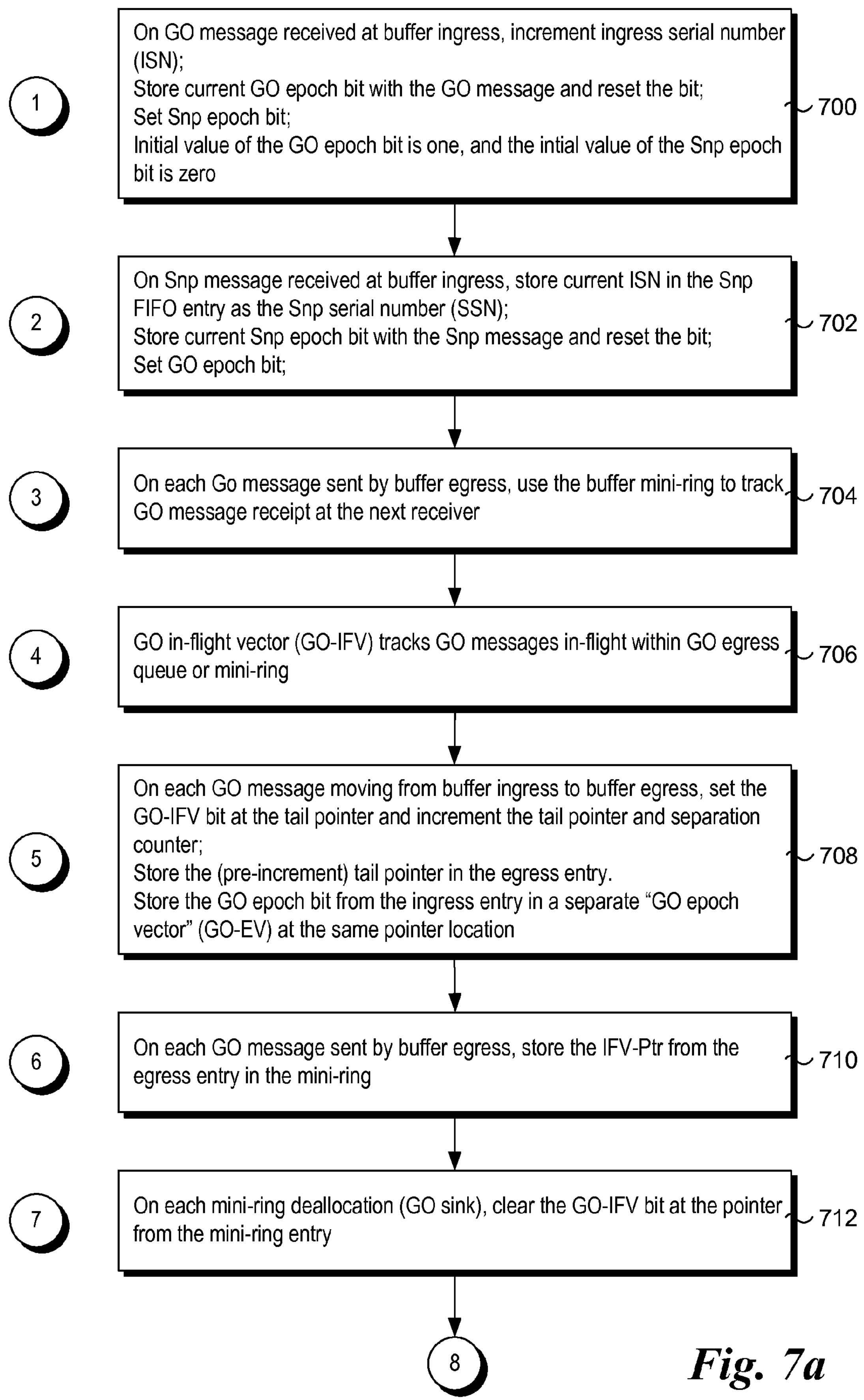
FIGS. 7*a* and 7*b* show a flowchart illustrating operations implemented by the one-way message ordering mechanism of FIG. 6 to facilitate one-way ordering of messages of independent message classes.
Figure 7B:
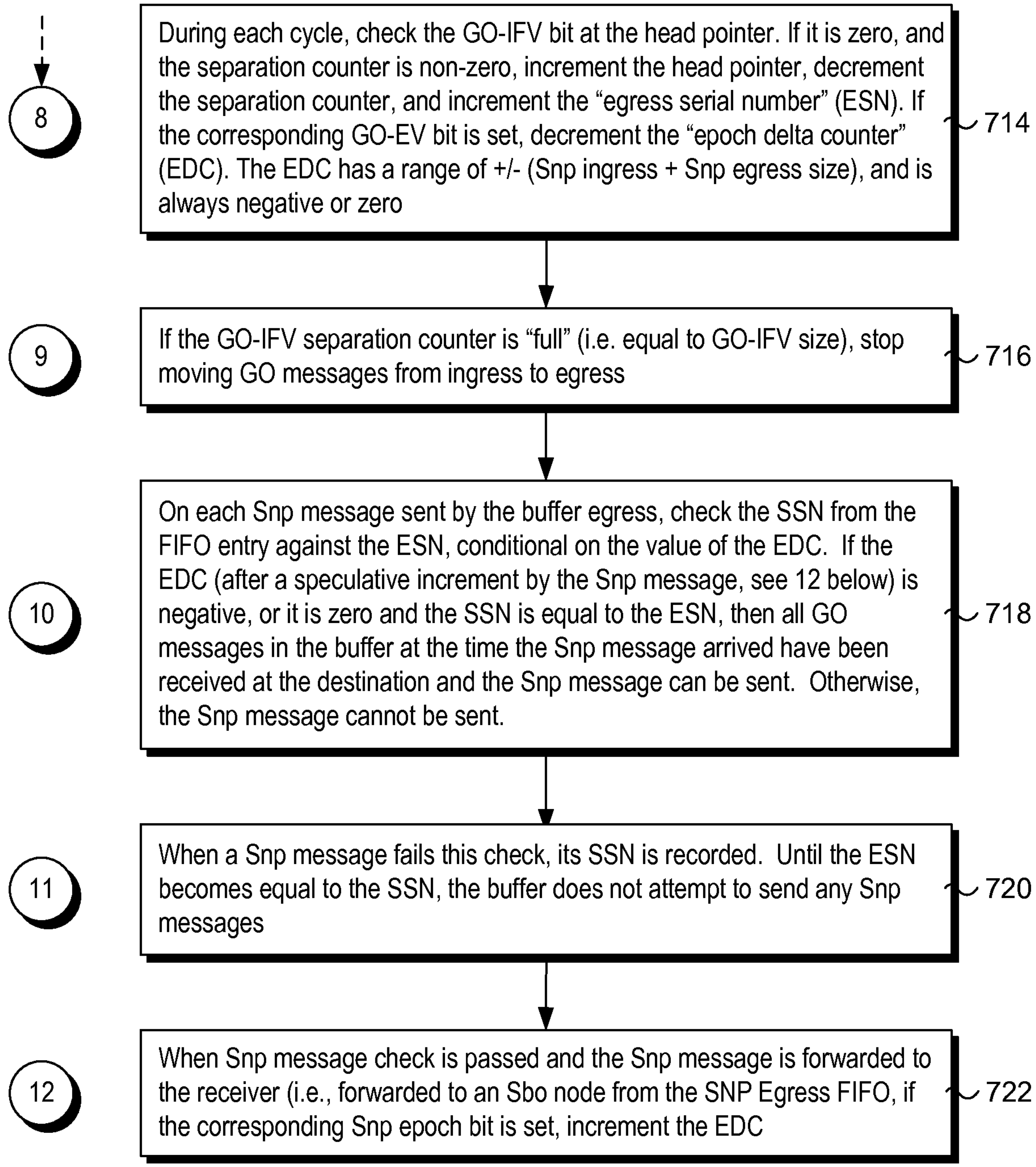

In accordance with one embodiment of the invention and reference to the flowchart of FIGS. 7A and 7B and the schematic diagram of FIG. 6, the following operations are performed to facilitate one-way ordering of GO and Snp messages such that GO messages for the same cache line are guaranteed to precede a corresponding Snp message. The operations are described using corresponding operation numbers below and in the flowchart.

1. In a block 700 of FIG. 7A, the process begins by incrementing an "ingress serial number" in ISN register 644 on receipt of each GO message at a buffer ingress (e.g., GO ingress FIFO 606). In one embodiment, the ISN has a range of 2× (GO ingress+GO-IFV size (described below in operation 4)) i.e., it has a wrap bit. The current "GO epoch" bit stored in GO epoch register 640 is stored with the GO message (after any setting by a Snp message received in the same cycle, see operation 2), as shown by GO epoch data block 616, and the "GO epoch" bit is reset (this takes precedence over the set in operation 2). The "Snp epoch" bit is then set in Snp epoch register 642 (this takes precedence over the reset in operation 2). The initial value of the "GO epoch" bit is one, and the initial value of the "Snp epoch" bit is zero.

2. As shown in a block 702, on each Snp message received by the buffer ingress, the current ISN (before any increment by a GO message received in the same cycle, see operation 1) is stored in the Snp FIFO entry as the Snp serial number (SSN) (e.g., in SSN data block 618 in Snp Ingress FIFO 608). The current "Snp epoch" bit (before any setting by a GO message received in the same cycle, see operation 1) is stored in Snp epoch data block 620 with the Snp message, and the "Snp epoch" bit is reset in Snp epoch register 642. The "GO epoch" bit is then set in GO epoch register 640.

3. On each GO message sent by buffer egress, the buffer mini-ring 622 is employed to track GO message receipt at the next receiver (details in subsequent operations), as shown in flowchart block 704. Mini-ring 622 works in a similar manner to the mini-ring described above for ensuring one-way message ordering within a ring interconnect. In a manner similar to that described above, it shadows the progress of the GO message as it traverses nodes in the Egress ring (i.e., the ring the messages are being transferred into) and determines when the GO messages are sunk.

4. The "GO in-flight vector" (GO-IFV) 632 tracks GO messages in-flight within the GO egress queue 602 or the mini-ring 622, as shown in flowchart block 706. Functionally, the size of the GO-IFV 632 could vary from one entry up to many; its use is to tolerate the GO egress queue and mini-ring depth and the out-of-order nature of egress based on direction/polarity and the mini-ring based on bouncing, as detailed below. The recommended size would be somewhere between the mini-ring depth and the size of the GO Egress queue plus the mini-ring depth. Corresponding data associated with the GO in-flight vector include tail pointer 634, head pointer 636, and separation counter 638.

5. On each GO message moving from buffer ingress to buffer egress, set the GO-IFV bit at the tail pointer 634 and increment the tail pointer and separation counter 638. Store the (pre-increment) tail pointer in the IFV-Ptr field of the egress entry in GO Egress Queue 602. Store the GO epoch bit from the ingress entry in a separate "GO epoch vector" (GO-EV) register 630 at the same pointer location. These operations are depicted in flowchart block 708.

6. On each GO message sent by buffer egress, store the IFV Ptr 610 from the egress entry in mini-ring 622, as shown in flowchart block 710.

7. On each mini-ring deallocation (i.e., GO sink), use the pointer stored in the mini-ring entry to clear the corresponding GO-IFV bit as shown in flowchart block 712.

8. As shown in flowchart block 714 in FIG. 7B, during each cycle, the bit of GO-IFV register 632 that is at the head pointer (Head Ptr 636) is checked. If it is zero, and the separation counter is non-zero, Head Ptr 636 is incremented, Sep Ctr 638 is decremented, and the "egress serial number" (ESN) in ESN register 626 is incremented. If in addition to that the GO-EV bit at the Head Ptr before the Head Ptr was incremented is set, the "epoch delta counter" (EDC) is decremented. In one embodiment, the EDC has a range of +/− (Snp ingress+Snp egress size), and is always negative or zero.

9. If the GO-IFV separation counter is "full" (i.e. equal to GO-IFV size), stop moving GO messages from ingress to egress, as shown in flowchart block 716.

10. On each Snp message sent by the buffer egress, the value in SSN data block 612 from the FIFO entry in Snp Egress FIFO is checked against the value in ESN register 626, conditional on the value of the EDC register 624. If the EDC value (after a speculative increment by the Snp message, see operation 12) is negative, or it is zero and the SSN is equal to the ESN, then all GO messages in the buffer at the time the Snp message arrived have been received at the destination and the Snp message can be sent. Otherwise (the EDC is non-negative and the SSN is greater than the ESN), the Snp message cannot be sent. These operations are shown in flowchart block 718.

11. As shown in flowchart block 720, when a Snp message fails this check, its SSN is recorded. Until the ESN becomes equal to the SSN, the buffer does not attempt to send any Snp messages. The EDC does not have to be checked because in this case it cannot become negative until the ESN becomes equal to the SSN. This means that each Snp message will be shot down at most once.

12. When the Snp message check is passed and the Snp message is forwarded to the receiver (i.e., forwarded from the Snp Egress FIFO 604), if the corresponding Snp epoch bit is set, EDC register 624 is incremented, as shown in flowchart block 722.

To extend this concept to per-source tunneling, a per-source ISN, ESN, GO and Snp epoch bits, and an EDC are employed. A per-source GO-IFV is not needed. In one embodiment, both GO and Snp messages already carry the source in the message payload, so no additional storage is required. The Snp message check at egress may become more complex, as it needs to choose the proper counters for comparison. To extend this concept to two GO messages received per cycle, the following can be done: (a) on any cycle that two GO messages are received, ISN is incremented by two; (b) at most one of the two GO messages received may have an epoch (whichever appears older in the GO Ingress FIFO). To extend this concept to a Snp Egress Queue (instead of FIFO) which can have Snp messages destined for opposite directions sent out-of-order, the following can be done: (a) arriving Snp messages carry an indication of the direction for which they are destined; (b) GO messages are tagged with two GO epoch bits maintained at Ingress, one corresponding to each Snp message direction; (c) Snp messages are tagged with one of two Snp epoch bits maintained at Ingress, depending on the direction for which they are destined; (d) two EDCs are maintained at Egress and are updated at the time of each GO message sinking as tracked by the mini-ring, according to the corresponding GO epoch bits for each Snp direction; (e) each Snp checks the proper EDC according to the direction for which it is destined, before dispatching from Egress.

The epoch portion of the scheme is employed because there is nothing to prevent the ESN from racing arbitrarily ahead of the SSN's in the Snp FIFO entries. The epoch controls when the ESN/SSN comparison is relevant, and when it can be ignored.

The serial number portion of the scheme is employed because a Snp needs to order with the immediately previous relevant GO. At the time the GO is received (and potentially starts a new epoch) it is not known whether it will become the last GO received before a Snp that is relevant to it. The serial number allows the Snp to identify when the immediately previous GO of the same epoch has been received at the next hop.

A new Snoop epoch is assigned any time a Snp arrives between two GOs. The GO after the Snp is assigned the next GO epoch. At the time the last GO before the Snp arrives, all the GO's still in the buffer (or mini-ring) have an unambiguous serial number, since the serial number size is 2× (GO ingress+GO-IFV size). When the next Snp arrives it will get the same serial number. Even if it gets to the head of egress before any more GOs are sent, it will know it is younger (i.e., received after the GO) based on the serial numbers being unambiguous. The following GO will be assigned the next epoch; so if that GO is sent before the Snp, then the Snp will ignore the serial number comparison based on the negative EDC. The EDC can never become so negative that it wraps to a positive value, since it is sized based on (Snp ingress+Snp egress size) and the epoch changes at most by one for each Snp.

In the foregoing example, the one-way message ordering mechanism is implemented between a pair of ring interconnects. However, the concepts disclosed herein may be implemented in other types of interconnects as well.

For example, consider an interconnect with an arbitrary topology, with any number of nodes interconnected by links. Each node provides the interface between a number of local agents to the rest of the interconnect. Each node also acts as a router in the interconnect. The nodes may have multiple input and output ports—including multiple local ports for sending/accepting messages from/to the local agents. Additionally, input or output ports may have associated buffers. However, the nodes may also be buffer-less (e.g., 2D Mesh nodes are buffered and have 4 input/output ports, and one local port, while ring nodes in one embodiment are buffer-less and have 2 input/output ports, and 1 or 2 local ports).

The messages in this exemplary interconnect are divided into a number of classes (e.g., ring messages are divided into 4 major classes, AD/BL/AK/IV). The point to point links connecting nodes either provide separate physical links for different message classes allowing for messages of different classes to be sent in parallel (e.g., using a ring configuration), or are virtualized, so that all messages classes share the same physical links and need to arbitrate and be sent in interleaved fashion (e.g., some 2D Mesh, or QPI fabric).

Each node passes messages belonging to the same class and between the same input and output ports in the order received, however if the node is buffered it may reorder messages that belong to different classes (this allows forward progress of different message classes by the interconnect). Notice that messages belonging to the same class sent between a source node and a destination node in the interconnect may not (or even need to) arrive in the order sent (this can happen if the messages are allowed to bounce, as explained later on).

Nodes may or may not have input port or output port buffers (in the form of FIFOs) to store messages before forwarding them. Nodes with multiple input or output ports have an internal interconnect (with physical or virtualized links) and associated flow control, arbitration, etc. enabling them to transfer messages from input ports to output ports. The nodes either support virtual channels for different message classes and share common physical links between the input and output ports, or have per message class buffering and internal interconnect between input and output ports.

If the node is buffered, then it uses back-pressure when its (input) buffers are full (and this could be based on the message type or destination port). A message that is back-pressured by the end node of a link stays in the sender node's (output) buffers if the node is buffered; but if the node is buffer-less, then the message is bounced and rerouted on the interconnect on a path of links that will eventually lead it back to the current node so that it gets another opportunity to be accepted by the node that previously bounced it (these are loss-less interconnects where message are never dropped). Note that messages may further be divided to credited and uncredited, where credited messages are always guaranteed to be accepted. And credits can be end-to-end or point-to-point.

Note that an interconnect may have a mixture of buffered and bufferless nodes (e.g., the system 100 interconnect has two rings composed of bufferless nodes interconnected via two bi-directional buffered switch nodes).

In such a general type of interconnect, there may be two messages belonging to two different message classes C1 and C2, with the requirement that if any node A sends a pair of these messages that are related in a certain way (e.g., related to the same address) to any other node B, then the C2 message (Snoop in the foregoing example) shall be received by B after the related C1 message (GO in the example); i.e., C2 messages shall not bypass related C1 messages on the path from A to B. Note that this does not prevent C1 messages from bypassing C2 messages.

To simplify the solution to this problem, we first require the two messages to take on the same nodal route in the interconnect, because if they were to take on different routes on the interconnect controlling their order of arrival may not be possible, or would require extraneous mechanisms. Note that such common routes may include circular paths, in case the messages may bounce; if both messages may bounce, we require their bounce paths to be the same as well. Next, we break the path between the source and destination nodes into sections, such that each section is either composed solely of buffered nodes, or solely of buffer-less nodes (the nodes at the interface between the sections are special nodes that act as buffer-less nodes connecting certain input ports to certain output ports, and act as buffered nodes connecting other input/output ports, such as the buffer switch nodes in system 100). Finally, on each of the sections of this path, we enforce rules that guarantee that the C2 messages will not bypass related C1 messages (to the particular receiver).

In the case of the exemplary ring interconnect of system 100, the two messages of interest are Snoop and GO (belonging to two different message classes). On the buffer-less part of the interconnect (i.e., the rings) these messages are sent on separate physical links. The SBos are the (physically stretched) buffered nodes of this interconnect, with input and output FIFOs per message class (more accurately, per AD/BL/AK/IV class) and separate physical links in between input and output FIFOs.

To impose order on the buffer-less paths (e.g., rings in the interconnect) the mini-ring mechanism is employed to ensure Snoops are sent only after GOs are received at the other end of the path. To impose order on the buffered path (e.g., the buffered switch nodes of the interconnect), the half-tunneling scheme is implemented within each buffered node (i.e., between each pair of input and output ports of buffered nodes). Note that the proposed half-tunneling on the buffered path (and the mini-ring mechanism) prevents Snoops from bypassing GOs, irrespective of source and destination of the messages. The scheme can be extended to enforce such ordering requirement per destination (including a property at destination, e.g., cache line address, etc), and theoretically even per source/destination pair, but at increasingly higher cost.

If the C1 message cannot bounce on a buffer-less portion of the path, then the mini-ring mechanism would degenerate to a simple mechanism where the senders may send any C2 message right after (all earlier/related) C1 messages, without having to wait for them to be accepted at the end point of the current path.

If the buffered section of the path between a sender node and a receiver node contains multiple nodes (e.g., in a 2D mesh), then each such node would implement the half-tunneling scheme between each pair of input and output ports. Accordingly, Snoop and GO sequences and epochs between different input and output ports would be tagged and identified separately. Each output port would then order C1 and C2 messages that it receives in the context of which input port they came from. This of course adds further complexity to the proposed scheme, but the necessary changes/extensions are straight forward.

To summarize: If on the path between a source and a destination node in the interconnect, each node guarantees delivery of any C1 message (that it receives) before all related/later C2 messages (that it receives) to a next node on the path (e.g., a node at the interface of buffer-less and buffered sections of the path, or an adjacent node in a buffered section of the path, or a node in the buffer-less section of the path), then by induction any C1 message sent from the source would be received at the destination before all related/later C2 messages sent.

The above description of illustrated embodiments of the invention, including what is described in the Abstract, is not intended to be exhaustive or to limit the invention to the precise forms disclosed. While specific embodiments of, and examples for, the invention are described herein for illustrative purposes, various equivalent modifications are possible within the scope of the invention, as those skilled in the relevant art will recognize.

These modifications can be made to the invention in light of the above detailed description. The terms used in the following claims should not be construed to limit the invention to the specific embodiments disclosed in the specification and the drawings. Rather, the scope of the invention is to be determined entirely by the following claims, which are to be construed in accordance with established doctrines of claim interpretation.

What is claimed is:

1. A method comprising:

enforcing a one-way message order mechanism for messages having independent message classes sent between first and second interconnects in an interconnect network, each of the first and second interconnects comprising a separate plurality of wiring pathways and coupled to separate pluralities of nodes and employing separate electronic pathways for messages belonging to the first and second message classes, wherein a message in a first message class is ensured to arrive at a destination node prior to a related message of a second message class sent to the destination node by employing a buffered mechanism between the first and second interconnects, wherein the buffered mechanism includes separate buffered paths corresponding to the first and second message classes and is configured to hold a message of a second message class received at the buffered mechanism in a later cycle than messages of a first class are received at the buffered mechanism and delay the message of the second message class from being sent out of the buffered mechanism until after the messages of the first class are sent out and received at their next destination.

2. The method of claim 1, wherein the interconnects comprise first and second ring interconnects.

3. The method of claim 1, wherein the interconnects comprise buffered nodes.

4. The method of claim 1, wherein the messages are employed to support a cache coherency protocol in a system employing multiple processors and/or processor cores.

5. The method of claim 4, wherein the first message class comprises a Global Observation message and the second message class comprises a Snoop message relating to a cache coherency protocol.

6. The method of claim 1, wherein the one-way message ordering is enforced without employing an identity of at least one of a source and destination node corresponding to the messages.

7. The method of claim 1, further comprising:

employing ingress and egress buffers for each buffered path.

8. An apparatus, comprising:

a first buffered path, configured to receive messages corresponding to a first message class from a first interconnect and to send received messages corresponding to the first message class to a second interconnect, each of the first and second interconnects comprising a separate plurality of wiring pathways and coupled to separate pluralities of nodes;

a second buffered path, configured to receive messages corresponding to a second message class from the first interconnect and to send received messages corresponding to the second message class to the second interconnect; and an interlock mechanism operatively coupled to the first and second buffered paths that manages ordered sending of messages of the first and second message classes received from the first interconnect and sent to the second interconnect, wherein the interlock mechanism is configured to ensure a message of a second message class received at the second buffered path in a later cycle than a message from a first class is received at the first buffered path is not sent out to the second interconnect until after the message of the first class is sent out and received at its next destination.

9. The apparatus of claim 8, wherein each of the first and second buffered paths include an ingress buffer and an egress buffer.

10. The apparatus of claim 9, wherein the ingress buffers are configured to receive messages from a ring stop node of a first ring interconnect having first and second rings respectively associated with the first and second message classes, and the egress buffers are configured to send out messages to a ring stop node of a second ring interconnect having first and second rings respectively associated with the first and second message classes.

11. The apparatus of claim 8, wherein a set of associated messages includes a message of the first message class and one or more messages of a second message class.

12. A system, comprising:

first and second ring interconnects, each having a separate plurality of nodes and comprising at least two separate pathways for transferring messages between nodes, including first and second rings used to transfer first and second message classes;

a plurality of processor cores, operatively coupled to respective nodes in the first and second ring interconnects, each processor core having at least one level of cache;

a plurality of cache agents operatively coupled to respective nodes in the first and second ring interconnects, each cache agent configured to send and receive messages of the first and second message classes; and a first buffered one-way message ordering mechanism operatively coupled between the first and second ring interconnects, configured to ensure that for messages of the first and second message classes sent from an agent in the first ring interconnect destined for one or more agents in the second ring interconnect, messages of the first class are forwarded to the second ring interconnect prior to messages of the second class such that a message of a second class received at an ingress of the ordering mechanism in a later cycle than a message of the first class may not be sent to the second ring interconnect until after the message of the first class is sent to the second ring interconnect and received at its next destination.

13. The system of claim 12, wherein a buffered one-way message ordering mechanism includes ingress and egress buffers for each of the first and second message classes, further comprising a first ring stop node in the first ring interconnect coupled to the ingress buffers and a second ring stop node in the second ring interconnect coupled to the egress buffers.

14. The system of claim 12, further comprising a second buffered one-way message ordering mechanism operatively coupled between the first and second ring interconnects configured to ensure that for messages of the first and second message classes sent from an agent in the second ring interconnect destined for one or more agents in the first ring interconnect, messages of the first class are forwarded to the first ring interconnect prior to messages of the second class.

15. The system of claim 14, wherein each of the first and second buffered one-way message ordering mechanisms includes ingress and egress buffers for each of the first and second message classes, further comprising a first ring stop node in the first ring interconnect coupled to the ingress buffers of the first buffered one-way message ordering mechanism and to the egress buffers of the second buffered one-way message ordering mechanism and a second ring stop node in the second ring interconnect coupled to the ingress buffers of the second buffered one-way message ordering mechanism and to the egress buffers of the first buffered one-way message ordering mechanism.

16. The system of claim 12, wherein the first message class includes a Global Observation message of a cache coherency protocol employed by the system, and the second message class includes a Snoop message associated with the cache coherency protocol.

* * * * *